S. KARAFAS.

MOTOR ATTACHMENT FOR SHIPS.

APPLICATION FILED NOV. 6, 1918.

1,293,110.

Patented Feb. 4, 1919.

Inventor

Stelios Karafas

By Lacey & Lacey, Attorneys

THE NORRIS PETERS CO., PHOTO-LITHO., WASHINGTON, D. C.

S. KARAFAS.
MOTOR ATTACHMENT FOR SHIPS.
APPLICATION FILED NOV. 6, 1918.

1,293,110.

Patented Feb. 4, 1919.
3 SHEETS—SHEET 2.

Inventor
Stelios Karafas
By
Lacey & Lacey, Attorneys

THE NORRIS PETERS CO., PHOTO-LITHO., WASHINGTON, D. C.

S. KARAFAS.
MOTOR ATTACHMENT FOR SHIPS.
APPLICATION FILED NOV. 6, 1918.

1,293,110. Patented Feb. 4, 1919.

Inventor
Stelios Karafas
By Lacey & Lacey, Attorneys

THE NORRIS PETERS CO. PHOTO-LITHO., WASHINGTON, D. C.

UNITED STATES PATENT OFFICE.

STELIOS KARAFAS, OF BALTIMORE, MARYLAND.

MOTOR ATTACHMENT FOR SHIPS.

1,293,110. Specification of Letters Patent. Patented Feb. 4, 1919.

Application filed November 6, 1918. Serial No. 261,400.

*To all whom it may concern:*

Be it known that I, STELIOS KARAFAS, a subject of the King of Greece, residing at the city of Baltimore and State of Maryland, have invented certain new and useful Improvements in Motor Attachments for Ships, of which the following is a specification.

This invention relates to ships and more particularly to an attachment for use in connection with sailing or steam propelled vessels for the purpose of producing an independent power to be used for any desired purpose.

The object of the invention is to provide an auxiliary power system including a water wheel or turbine which is actuated by the rush of water passing through suitable tubes or conductors extending rearwardly from the bow of the vessel, power being transmitted from the turbine to a dynamo, motor, pump or other mechanism to be operated.

The invention further contemplates the provision of an expansion chamber which communicates with the interior of the turbine casing and into which water from said casing is directed and thence conducted through a pipe and discharged at the stern of the vessel.

The invention further aims to provide a novel form of water wheel or turbine and a novel form of water receiving chamber arranged adjacent thereto and having a nozzle for increasing the velocity of the water and directing it against the blades of the turbine.

A further object is to provide a system of valves for controlling the flow of water to the turbine, said valves also serving to permit drainage of the water conductors and the several chambers when desired.

A still further object of the invention is generally to improve this class of devices so as to increase their utility, durability and efficiency.

In the accompanying drawings:

Fig. 7 is a detail longitudinal sectional view showing the nozzle or ejector disposed within the discharge conductor.

Corresponding and like parts are indicated in all the views of the accompanying drawings by the same reference characters.

The auxiliary power system forming the subject matter of the present invention may be applied to sailing or power propelled vessels and by way of illustration is shown in connection with a steamship of the ordinary construction in which 5 designates the hull and 6 the superstructure.

Figure 4:
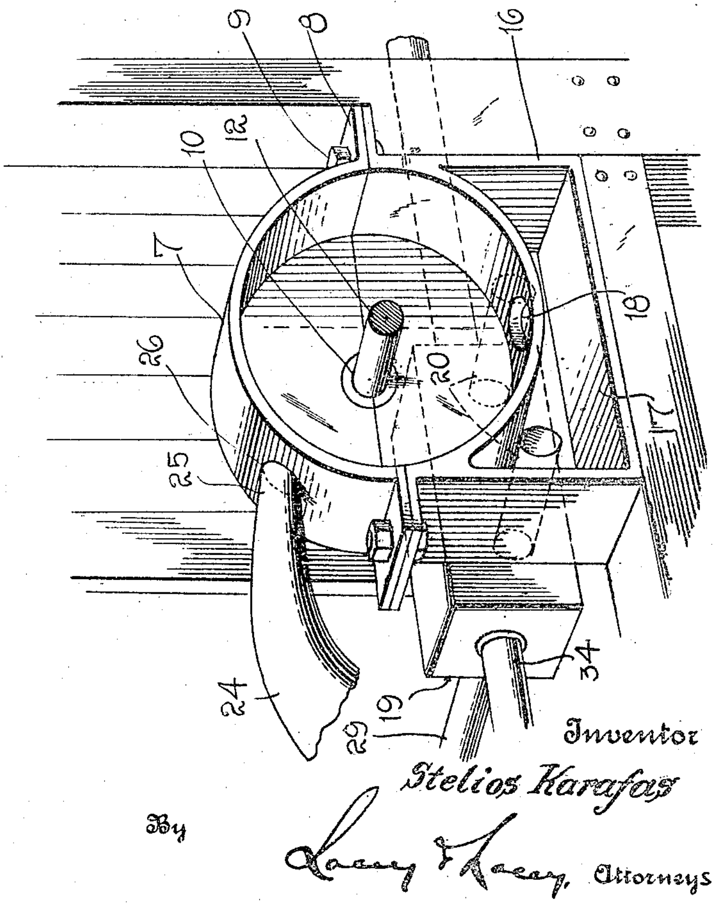
Fig. 4 is a perspective view of the turbine casing with the water wheel or turbine removed and one side of the casing detached in order to show the interior construction thereof.

The device comprises a casing 7 preferably cylindrical in form and including upper and lower sections having laterally extending flanges 8 detachably connected by bolts or similar fastening devices 9. Journaled in suitable bearings 10 in the side walls 11 of the casing is a shaft 12 to which is keyed or otherwise rigidly secured a water wheel or turbine 13. The turbine 13 is preferably formed of a plurality of arms 14 radiating from a central hub and the end of each arm 14 is preferably bifurcated to form substantially V-shaped pockets 15 adapted to receive the impact of the water as the vessel travels therethrough. The lower section of the casing 7 is provided with a substantially rectangular extension 16 defining a chamber 17, there being an opening 18 formed in the adjacent wall of the casing 7 and communicating with the chamber 17, as best shown in Fig. 4 of the drawings. Disposed in spaced relation to the casing 7 is an expansion chamber 19 preferably in the form of a rectangular box from one side of which extend spaced tubes 20 leading into the chamber 17 and through which the exhaust water from the turbine is discharged into the expansion chamber.

Figure 1:
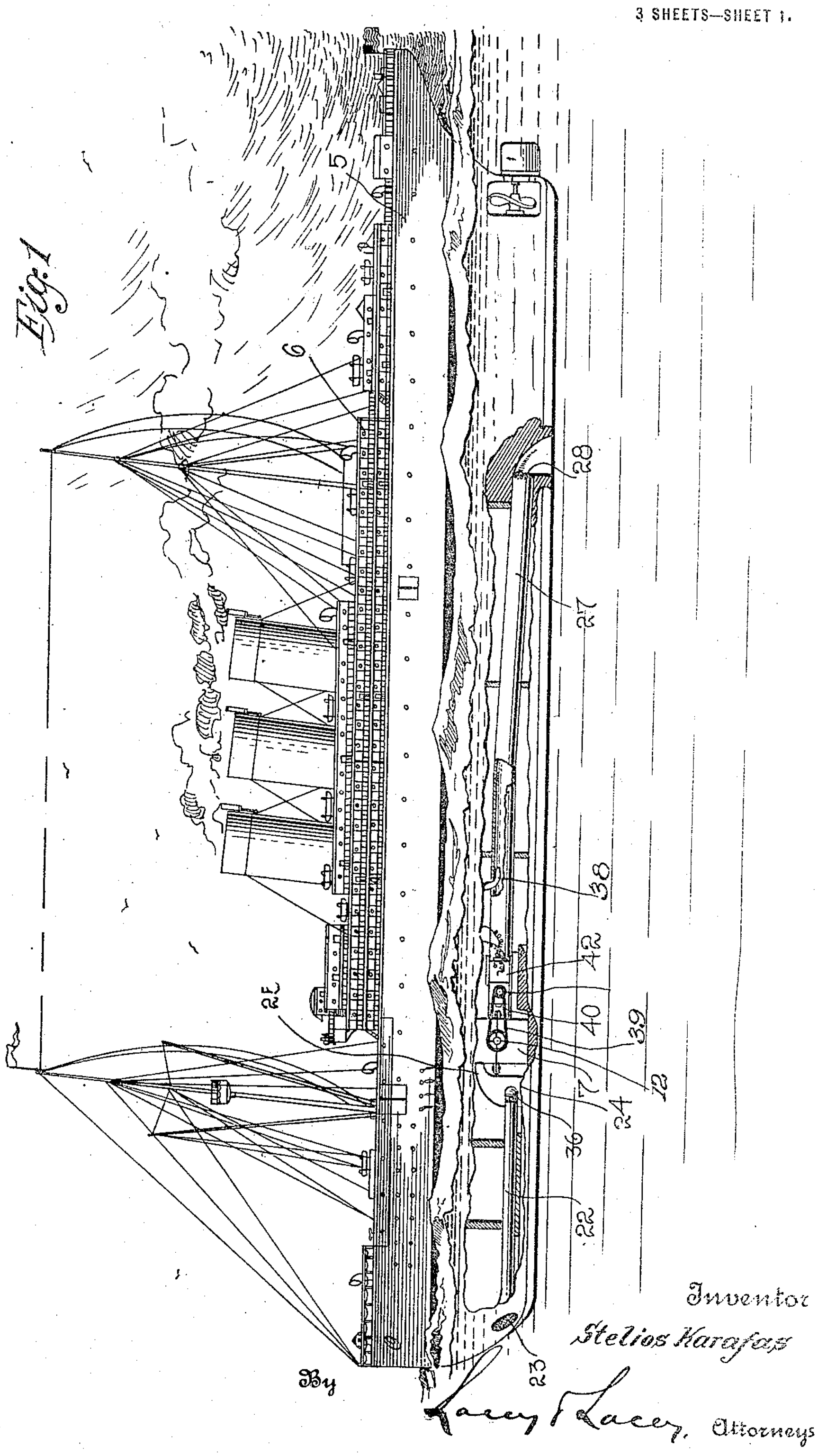
Figure 1 is a side elevation, partly in section, of a steamship of conventional form provided with an auxiliary power system constructed in accordance with the present invention.
Figures 1, 2, 3:
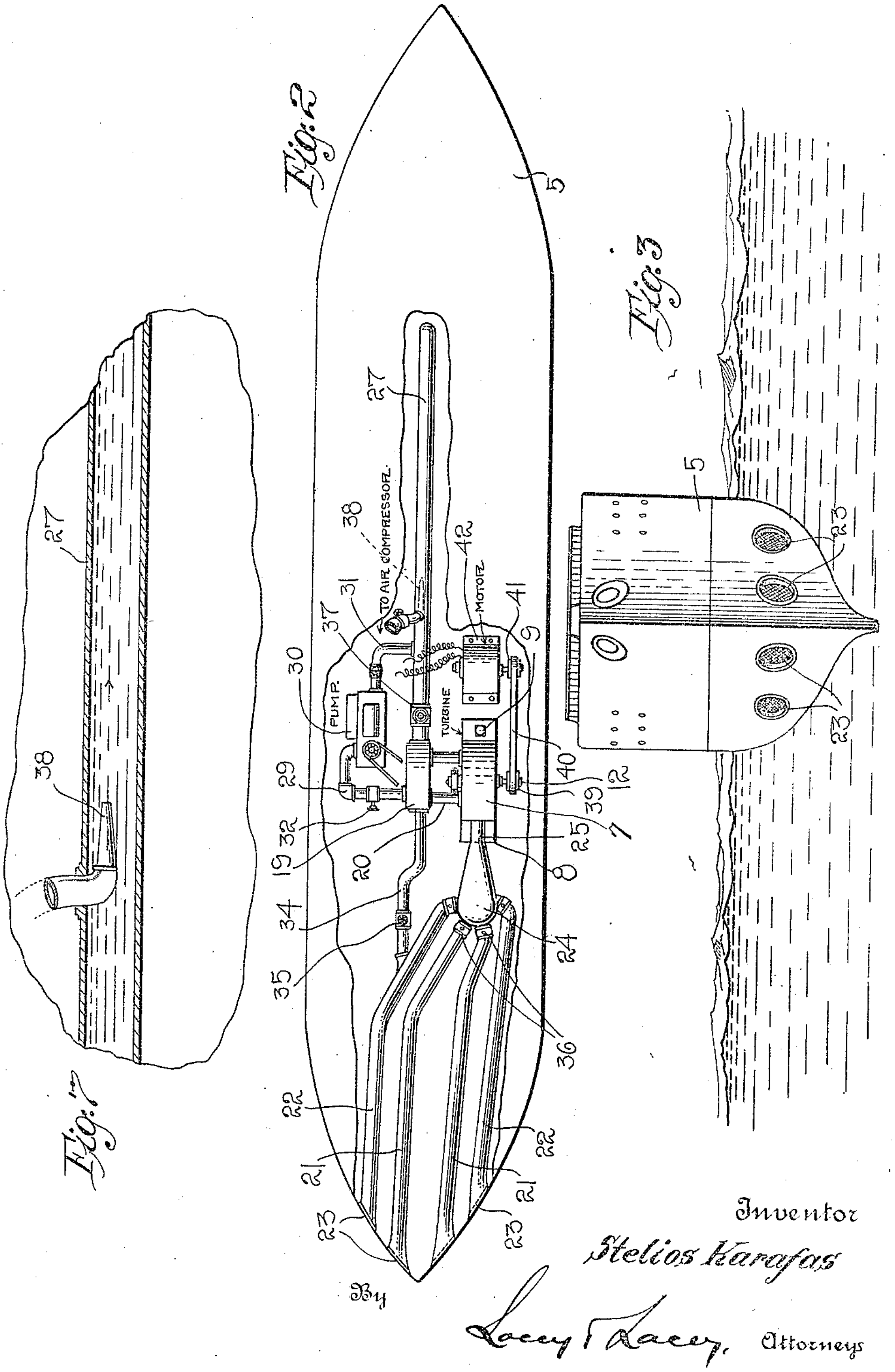
Fig. 2 is a top plan view, partly in section, with the superstructure removed in order to show the construction of the different parts constituting the power system.
Fig. 3 is a front elevation.
Figure 5:
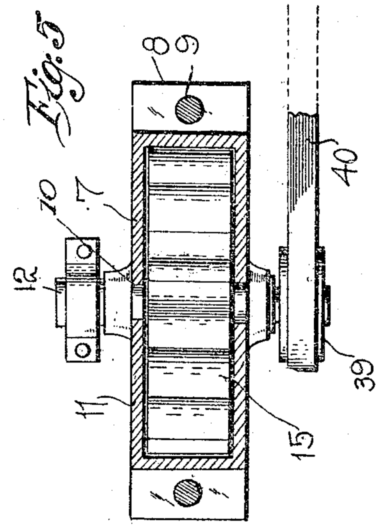
Fig. 5 is a transverse sectional view of the turbine casing with the turbine in operative position therein.
Figure 6:
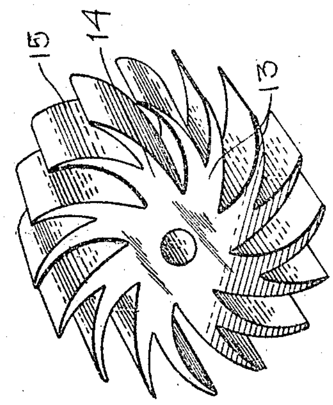
Fig. 6 is a perspective view of the water wheel or turbine detached.

Extending longitudinally of the hull of the vessel and below the water line thereof are spaced tubes 21 and 22 each opening through the bow of the vessel and having its intake normally closed by a strip of wire screen or other foraminous material 23. The conductors 21 and 22 extend rearwardly of the hull of the vessel and discharge into a receiving chamber 24 the latter being reduced at one end to form a nozzle 25 which enters the casing 7 at a point near the top thereof as indicated at 26. Extending rearwardly from the expansion chamber or box 19 is a discharge tube or conductor 27 one end of which communicates with the interior of the expansion chamber 19 while the other end thereof discharges at a point adjacent the stern of the vessel, and is provided with a closure of wire gauze or screen 28. Extending laterally from one side of the expansion chamber or box 19 is a pipe or conductor 29 leading to a pump 30 of any suitable construction, the exhaust from the pump being arranged to discharge into a conductor 31 connected with the conductor 27, as best shown in Fig. 2 of the drawings. The pipe 29 is provided with a valve 32 by means of which the water from the expansion chamber to the pump may be controlled at will. Extending rearwardly from one of the conductors 22 is a pipe 34 leading into the expansion chamber and provided with a valve 35. Suitable valves 36 are also arranged at the receiving chamber for the purpose of controlling the admission of water from the conductors 21 and 22 to the interior of said receiving chamber. A valve 37 is arranged within the conductor 27 and spaced from said valve and extending within the conductor is an ejector 38 leading to an air compressor, steam boiler or other suitable source of fluid supply for the purpose of accelerating the flow of water through the discharge conductor 27.

One end of the shaft 12 is extended laterally beyond the adjacent wall of the casing 7 and is provided with a pulley 39 over which passes a belt 40 leading to the power pulley 41 of a generator or other mechanism to be operated and indicated at 42. It will of course be understood that this generator may be used for generating electricity for lighting purposes.

It will thus be seen that as the vessel travels in a forwardly direction through the water the latter will flow through the conductors 21 and 22 with a velocity corresponding to the speed of travel of the vessel and enter the receiving chamber 24, it of course being understood that when the device is to be used the valves 36 and 37 will be moved to open position and the valve 32 moved to closed position. As the water enters the receiving chamber 24 the velocity thereof will be increased by the nozzle 25 and the water forcibly directed in a solid stream into the pockets 15 of the turbine or water wheel, thus causing the water wheel to rotate and transmit motion through the medium of the belt 40 to the generator 42. As the turbine rotates the exhaust water will pass through the opening 18 into the chamber 17 and thence through the short tubes 20 into the expansion chamber 19 from whence it flows through the conductor 27 and is discharged at the rear of the vessel through the opening 28, as best shown in Fig. 1 of the drawings. By opening the valve 32 a portion of the waste water from the turbine casing may be permitted to flow through the pipe 29 to the pump 30 for the purpose of operating the pump. If desired the discharge of water through the conductor 27 may be accelerated by introducing steam, compressed air or other fluid through the ejector 38.

In order to prevent freezing of the water within the casing and expansion chamber when the vessel is docked or for any reason detained at a port for a considerable length of time the valves 35, 36 and 37 are closed and the valve 32 opened, after which the pump 30 is operated which discharges the water from the receiving chamber into the turbine casing and thence out through the chamber 17 and lateral pipes 20 into the expansion chamber and from the expansion chamber through the pipe 29, pump 30 and pipe 31 into the conductor 27, thus allowing these parts to remain perfectly dry and prevent damage thereto by freezing. The short pipe 34 forms a source of communication between the adjacent conductor 22 and the expansion chamber so that a portion of the water entering said conductor will flow through said pipe 34 into the expansion chamber and thence into the discharge conductor 27, the flow of water through the parts serving to create a partial suction within the chamber 17 and thus assist in discharging the waste or exhaust water therefrom during the operation of the device.

The device is extremely simple in construction and will prove a valuable adjunct for floating craft of all types.

Having thus described the invention, what is claimed as new is:

1. The combination with a vessel, of a casing, a turbine mounted for rotation within the casing, a water conductor extending from the front of the vessel below the water line thereof and communicating with the interior of the casing, an expansion chamber connected with the casing, a water conductor leading from the expansion chamber and discharging near the rear of the vessel, and means for transmitting motion from the turbine to suitable mechanism on said vessel.

2. The combination with a vessel, of a casing, a turbine mounted for rotation within the casing, a receiving chamber having a nozzle discharging into the casing, a water conductor extending from the bow of the vessel into the receiving chamber, an expansion chamber adapted to receive the water discharged from the turbine, a water conductor leading from the expansion chamber and discharging near the stern of the vessel, a valve disposed within the receiving chamber for controlling the supply of water thereto, and means for transmitting motion from the turbine to suitable mechanism on said vessel.

3. The combination with a vessel, of a casing, a turbine mounted for rotation within the casing, a receiving chamber having a nozzle discharging within the casing, spaced conductors connected with the receiving chamber and leading to the bow of the vessel below the water line thereof, an expansion chamber connected with the casing, a pipe forming a connection between one of the conductors and the expansion chamber, a water conductor connected with the expansion chamber and discharging near the stern of the vessel, and means for transmitting motion from the turbine to suitable mechanism on said vessel.

4. The combination with a vessel, of a casing, a turbine mounted for rotation within the casing, a receiving chamber having a nozzle discharging within the casing, a conductor extending from the receiving chamber to the bow of the vessel below the water line thereof, an expansion chamber communicating with the casing, a water conductor leading from the expansion chamber to a point near the stern of the vessel, a pump having inlet and discharge pipes communicating respectively with the expansion chamber and discharge conductor, and means for transmitting motion from the turbine to suitable mechanism on said vessel.

5. The combination with a vessel, of a casing, a turbine mounted for rotation within the casing, a receiving chamber having a nozzle discharging within the casing, a conductor extending from the receiving chamber to the front of the vessel below the water line thereof, an expansion chamber communicating with the casing, a pipe forming a connection between the water conductor and the expansion chamber, a valve disposed in said pipe, a water conductor leading from the expansion chamber and discharging near the rear of the vessel, a valve in said discharge conductor, a valve in the receiving chamber, means for exhausting the water in the casing, receiving and expansion chambers respectively, and means for transmitting motion from the turbine to suitable mechanism on said vessel.

6. The combination with a vessel, of a casing, a turbine mounted for rotation within the casing, a receiving chamber having one end thereof reduced to form a nozzle discharging into the casing, spaced conductors leading from the receiving chamber to the front of the vessel below the water line thereof, an expansion chamber connected with the casing, a pipe forming a connection between one of the water conductors and the expansion chamber, a water conductor extending from the expansion chamber and discharging near the rear of the vessel, a pump operatively connected with the expansion chamber, and means for transmitting motion from the turbine to suitable mechanism on said vessel.

7. The combination with a vessel, of a casing, a turbine mounted for rotation within the casing, a receiving chamber having one end thereof reduced to form a nozzle discharging within the casing, spaced conductors connected with the receiving chamber and opening through the bow of the vessel below the water line thereof, an expansion chamber, laterally extending tubes forming a connection between the expansion chamber and the casing, a pipe extending from the expansion chamber and connected with one of the water conductors, a valve in said pipe, spaced valves within the receiving chamber for controlling the water admitted thereto, a water conductor connected with the expansion chamber and discharging near the rear of the vessel, a valve connected in said discharge conductor, and means connected with the expansion chamber for draining the water from the casing, receiving chamber and expansion chamber and directing said water into the discharge conductor at a point in advance of the valve therein.

8. The combination with a vessel, of a casing having a water receiving compartment arranged beneath the same and provided with an opening forming a source of communication between the interior of the casing and said compartment, a turbine mounted for rotation within the casing, a receiving chamber having a nozzle discharging into the upper portion of the casing, a conductor leading from the receiving chamber to the bow of the vessel, an expansion chamber, spaced tubes forming a connection between the expansion chamber and the water compartment of the casing, a water conductor connected with the expansion chamber and discharging near the stern of the vessel, and means for transmitting motion from the turbine to suitable mechanism on said vessel.

9. The combination with a vessel, of a casing having a water receiving compartment, there being an opening formed in the casing communicating with said compartment, a turbine mounted for rotation within the casing and provided with a plurality of arms the ends of which are bifurcated to form pockets, a receiving chamber having a nozzle for discharging water into said pockets, a conductor extending from the receiving chamber to the bow of the vessel below the water line thereof, an expansion chamber, tubes forming a connection between the expansion chamber and the water compartment of the casing, a water conductor connected with the expansion chamber and discharging near the stern of the vessel, valves for cutting off the supply of water to the receiving chamber, and means for draining the water out of the receiving chamber, casing, water compartment and expansion chamber and directing said water into the discharge conductor.

10. The combination with a vessel, of a cylindrical casing formed of upper and lower sections detachably united, the lower section being formed with a substantially rectangular water receiving compartment communicating with the interior of the casing through a port formed in the lower section of the casing, there being an opening formed in the upper section of the casing, a receiving chamber having one end thereof reduced to form a nozzle projecting within the opening of the upper section of the casing, a turbine mounted for rotation within the casing and provided with radiating arms the ends of which are bifurcated to form pockets adapted to receive the water from the nozzle, a conductor communicating with the receiving chamber and opening at the bow of the vessel below the water line thereof, an expansion chamber, tubes extending laterally from the expansion chamber and communicating with the interior of the water compartment, a water conductor extending from one end of the expansion chamber and discharging near the stern of the vessel, and means for transmitting motion from the turbine to suitable mechanism on said vessel.

In testimony whereof I affix my signature.

STELIOS KARAFAS. [L. S.]

Copies of this patent may be obtained for five cents each, by addressing the "Commissioner of Patents, Washington, D. C."